(12) United States Patent
Richardson et al.

(10) Patent No.: US 7,783,632 B2
(45) Date of Patent: Aug. 24, 2010

(54) USING POPULARITY DATA FOR RANKING

(75) Inventors: Matthew R. Richardson, Seattle, WA (US); Eric D. Brill, Redmond, WA (US); Robert J. Ragno, Kirkland, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 11/266,026

(22) Filed: Nov. 3, 2005

(65) Prior Publication Data

US 2007/0100824 A1 May 3, 2007

(51) Int. Cl.
G06F 7/00 (2006.01)
G06F 17/30 (2006.01)
(52) U.S. Cl. .................... 707/727; 707/748
(58) Field of Classification Search ............... 707/7, 707/5, 102, 999.007, 999.005, 999.102, 725, 707/727, 748
See application file for complete search history.

(56) References Cited

U.S. PATENT DOCUMENTS

| 6,006,218 | A | 12/1999 | Breese et al. |
| 6,460,036 | B1 | 10/2002 | Herz |
| 6,963,867 | B2 | 11/2005 | Ford et al. |
| 7,080,073 | B1* | 7/2006 | Jiang et al. ............. 707/7 |
| 7,089,237 | B2 | 8/2006 | Turnbull et al. |
| 2003/0018621 | A1 | 1/2003 | Steiner et al. |
| 2003/0093338 | A1 | 5/2003 | Kim et al. |
| 2003/0135490 | A1* | 7/2003 | Barrett et al. ............ 707/3 |
| 2004/0111412 | A1* | 6/2004 | Broder ................... 707/7 |
| 2005/0060310 | A1 | 3/2005 | Tong et al. |
| 2005/0065916 | A1 | 3/2005 | Ge et al. |
| 2005/0076014 | A1 | 4/2005 | Agarwal et al. |

(Continued)

FOREIGN PATENT DOCUMENTS

KR 102001084841 A 9/2001

(Continued)

OTHER PUBLICATIONS

"Click fraud roils search advertisers," Olsen, Stefanie, CNET News, Mar. 4, 2005. Retrieved on Dec. 19, 2008 from http://news.cnet.com/Click-fraud-roils-search-advertisers/2100-1024_3-5600300.html.*

(Continued)

Primary Examiner—James Trujillo
Assistant Examiner—Bruce M Moser
(74) Attorney, Agent, or Firm—Hope Baldauff Hartman, LLC (57) ABSTRACT

A unique ranking system and method that facilitates improving the ranking and ordering of objects to further enhance the quality, accuracy, and delivery of search results in response to a search query. The system and method involve monitoring and tracking an object in terms of the number of times it's been accessed and optionally by whom, when, for how long, and an access rate. The user's interaction with the object can be tracked as well. By tracking the objects, a popularity measure can be determined. Popularity based rankings can be computed based on the popularity measure or some function thereof. The popularity measure can be affected by the access time, who accessed it, access duration or the user's interaction with the object upon access. The popularity based rankings can be utilized by a search component to improve the quality and retrieval of search results.

16 Claims, 10 Drawing Sheets

U.S. PATENT DOCUMENTS

| | | | |
|---|---|---|---|
| 2005/0198268 A1* | 9/2005 | Chandra | 709/224 |
| 2005/0216434 A1 | 9/2005 | Haveliwala et al. | |
| 2006/0123014 A1 | 6/2006 | Ng | |
| 2006/0129533 A1 | 6/2006 | Purvis | |
| 2006/0136378 A1 | 6/2006 | Martin | |
| 2006/0161534 A1 | 7/2006 | Carson, Jr. et al. | |
| 2006/0204142 A1 | 9/2006 | West et al. | |
| 2006/0218114 A1 | 9/2006 | Weare et al. | |
| 2007/0032942 A1 | 2/2007 | Thota | |
| 2007/0094255 A1* | 4/2007 | Acharya et al. | 707/5 |
| 2007/0276829 A1* | 11/2007 | Wang et al. | 707/7 |
| 2008/0270404 A1* | 10/2008 | Borkovsky et al. | 707/7 |

FOREIGN PATENT DOCUMENTS

| | | |
|---|---|---|
| KR | 1020010108877 A | 12/2001 |
| KR | 1020040074693 A | 8/2004 |
| WO | 2004066180 A1 | 8/2004 |

OTHER PUBLICATIONS

International Search Report dated Mar. 26, 2007 mailed Mar. 26, 2007 for PCT Application Serial No. PCT/US2006/042732, 3 Pages.

Claypool et al., "Inferring User Interest", Date: 2001, http://citeseer.ist.psu.edu/cache/papers/cs/22061/ftp: zSzzSzftp.cs.wpi.eduzSzpubzSztechreportszSz01-07.pdf/claypool01inferring.pdf.

Joachims, Thorston, "Optimizing Search Engines using Clickthrough Data", Date: 2002, http://www.cs.cornell.edu/people/tj/publications/joachims_02c.pdf#search=%22%22Optimizing%20Search%20Engines%20Using%20Clickthrough%22%22.

Morita et al., "Information Filtering Based on User Behavior Analysis and Best Match Text Retrieval", Date: 1994, pp. 272-281, Springer-Verlag New York, Inc., New York, US, http://delivery.acm.org/10.1145/190000/188583/p272-morita.pdf?key1=188583&key2=3335085511&coll=GUIDE&dl=GUIDE&CFID=209216&CFTOKEN=77405777.

Wang et al., "QueryFind: Search Ranking Based on Users' Feedback and Expert's Agreement", Date: Mar. 2004, pp. 299-304, http://ieeexplore.ieee.org/iel5/9045/28698/01287326.pdf?isnumber=28698&arnumber=1287326.

Chinese Official Action dated Jun. 5, 2009 in Chinese Application Serial No. 200680040187.1.

* cited by examiner

USING POPULARITY DATA FOR RANKING

BACKGROUND

Searching has become such an important feature of applications and operating systems for computer users. Even more so, it has turned into a highly profitable sector within the computing marketplace. On the one hand, advertisers are buying keywords and/or paying a premium for a desirable listing position when certain search terms are entered. On the other hand, consumers are primarily focused on the quality of the search and often select the search application or engine based on the engine's past performance or reputation.

Most commonly, users initiate text searches to look for specific content on the Internet, on their network, or on their local PC. A search request can appear in a variety of formats. The user can use keywords, a phrase, or any combination of words depending on the content he/she is seeking and the location of the search. Search results are returned according to some correlation between the terms entered by the user and the terms associated with a web page, for example. When several web pages exist that relate to the same or similar terms, there must be some technique in place to order or prioritize the pages for the user to give the user an idea of which pages are better or perhaps more relevant to the user's search.

Conventional ranking systems exist to perform this ordering based on algorithms. One in particular typically ranks a web page according to a function of how many other pages point to it. However, this system is primarily focused on web pages and requires knowledge of the link structure of the web. Furthermore, most conventional ranking systems tend to be limited to text pages. Thus, there is much opportunity for improving search capabilities.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate using popularity data to improve the ranking of objects and ultimately, to obtain more relevant search results. More specifically, the system and method involve tracking which objects have been viewed, visited, or accessed to determine a measure for each and using the measure or some function thereof to determine a popularity based ranking for each of the objects. Examples of objects may include, but are not limited to, documents, files, text pages, video, movies, music (audio), images, and/or web pages.

In general, the popularity based ranking of an object can be determined in whole or in part by counting the number of times the object is accessed. The weight of the count can be affected by other factors such as the user's action performed with respect to the object, the rate at which the object is accessed by the same user or by different users, or the user ID or machine ID that accessed the object. By accounting for these types of factors, inflated rankings for "bad" objects can be mitigated. In some cases, a straight count, rather than a function thereof, may provide the most reasonable indication of popularity of the object.

Aside from recording when objects are accessed, the system and method can monitor other types of user activity which may affect the popularity based ranking. Examples of user activity can include, but are not limited to, modifying the object, clicking on a link in the object, scrolling through the object, book-marking or saving the object, or clicking "back" or a similar command within seconds of accessing or viewing the object, such actions can be tracked and recorded. These types of actions reflect on the quality of the link and therefore can indicate whether the object is "good". Good objects presumably receive a higher ranking.

Accessed objects can be identified and recorded in a database, table, or list form. Other information such as when the object is accessed, by whom (e.g., machine ID or user ID), for how long, and user interaction with the object can be recorded as well to facilitate determining the popularity of the objects.

Any information obtained from tracking and monitoring the objects can be employed to assign a score to each object. Once the objects are scored, they can be ordered to facilitate more efficient and accurate retrieval by search systems. The score can be determined in part by using machine learning techniques, whereby data for any number of features are entered and a score is calculated. The popularity of the object can be determined by one or more features or factors as previously mentioned (e.g., user activity, rate of access, etc.). Other features can include the number of other objects that link to it, user ratings of the object, other rankings of the objects as determined by other ranking schemes or models, the number of words in the object, the time or date the object is accessed, and/or user interests.

The various features can be weighted depending on whether a specific ranking is desired. For example, if the user would like to only rank objects accessed in the morning hours, then the training data used to teach the ranking component can rely more heavily on or at least include the time the object is accessed. Thus, the access time feature can be given greater weight than some of the other features. Conversely, if time is less important to this ranking scheme, then the time feature can be weighted less than the other features or given no weight at all. Once determined, object rankings can be utilized with respect to search systems or components to improve or enhance the quality and/or accuracy of search results.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with tracking user behavior and interactions with objects and determining whether to include a count of the object accessed by the user based on such behavior. For example, imagine User Bob browses the Internet frequently and has opted into a voluntary program to provide feedback to the browser system about the pages he visits. The system can be trained to automatically assign a weight to the information acquired from Bob or about Bob. Thus, the page that Bob visits can be scored and ranked to improve Bob's searching experience. This can occur in an automatic fashion without needing to first ascertain how often Bob visits the page, for how long, etc. This process can be automated in this manner when users have been deemed trustworthy (e.g., non-spammer).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Devising a high quality, query-independent (or -dependent) system for ordering objects such as web pages, documents, images, movies, and music can be difficult but such a system may be quite beneficial for a search engine or search component. By ordering pages well, the search engine, for example, can optimize its retrieval of pages from the web as well as the order by which it scans through its index to find the best matches to a query, and can improve the overall relevance of the pages returned for a given query. As discussed in more detail below, the popularity of an object as determined in part by how many times the object is accessed can provide an improved and overall better ranking of the object. In fact, experimental data supports a substantial performance gain in obtaining more accurate search results compared to the measured performance of conventional systems.

Figure 1:
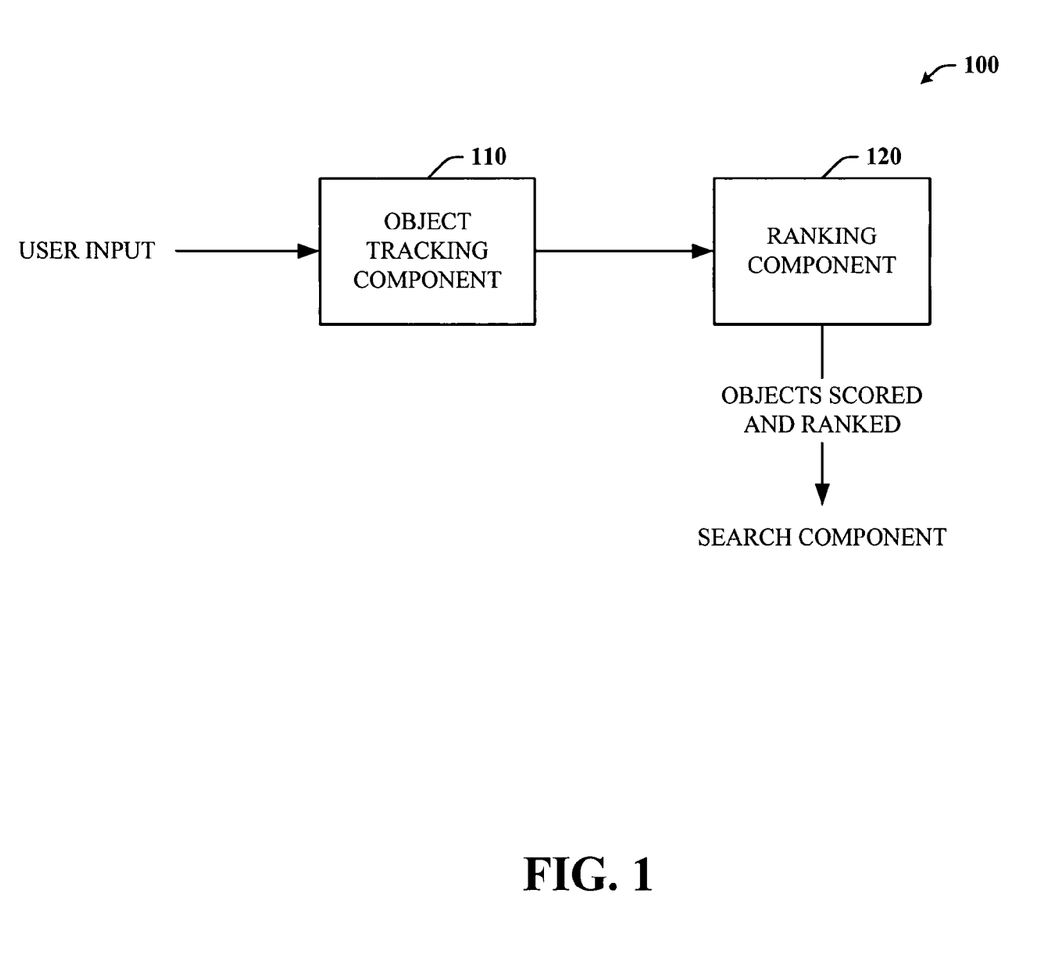
FIG. 1 is a block diagram of a data ranking system that facilitates improving the quality and accuracy of search results for searches conducted on the Internet, intranet, and/or a user's desktop or local file storage system.

Referring now to FIG. 1, there is a general block diagram a data ranking system 100 that facilitates improving the quality and accuracy of search results for searches conducted on the Internet, intranet, and/or a user's desktop or local file storage system. The system 100 is based in part on an object's popularity or a function thereof. For instance, the object's popularity can be determined in part by looking at how often the object is accessed (access count or measure). In particular, the system 100 includes an object tracking component 110 that can monitor and/or track one or more objects which have been accessed by a user. Alternatively, the tracking component 110 can also track which objects have been made available to the user—such as in a search results listing—but have been ignored (e.g., not accessed) by the user. The number of times an object is not accessed by the user when made available to the user can be used to ascertain the object's popularity as well.

In addition to the access count of the object, the tracking component 110 can also record other types of data or information that relate to the user alone or to the user's interaction with the object. The object's apparent popularity based on the access count can be further affected (e.g., supported or diminished) by the other types of data collected about the object. In particular, the tracking component 110 can also recognize the user's behavior or actions performed with respect to the object. For example, the tracking component 110 can detect that most if not all users who access a certain object always click "back" to view their previous screen almost immediately after the object is initially opened. This type of behavior can indicate that the object name or identification may appear to be very relevant to the user based on a search query, but actually may be a fake or fraudulent object that is created and/or operated by a spammer. In such cases, this type of user action can discount the access count to as little as zero. Conversely, other user actions such as scrolling through the object, book-marking or saving the object can signify that the object is what it claims to be. At a minimum, this information can validate the access count obtained for the object.

All or at least a portion of the information collected by the object tracking component 110 can be employed by a ranking component 120. Using the raw information or some other values derived therefrom, the ranking component 120 can determine a score for each object and then assign rankings or an ordering of the objects. In particular, the ranking component can determine the score using a ranking function (e.g., at least one) and the popularity data. These rankings can be communicated to a search component in order to improve search results returned to the user (in response to a search query).

It should be appreciated that rankings can also be assigned in a query-dependent manner. That is, the objects can be ranked and ordered based on the user's search query. The ranking function may use the popularity data differently based on features of the user's search query and the user who issued the query. Such features can include but are not limited to the time the query was issued, the demographics of the user, the identity of the user, user profile data, the length of the query, content, or subject matter of the query, and the like.

Figure 2:
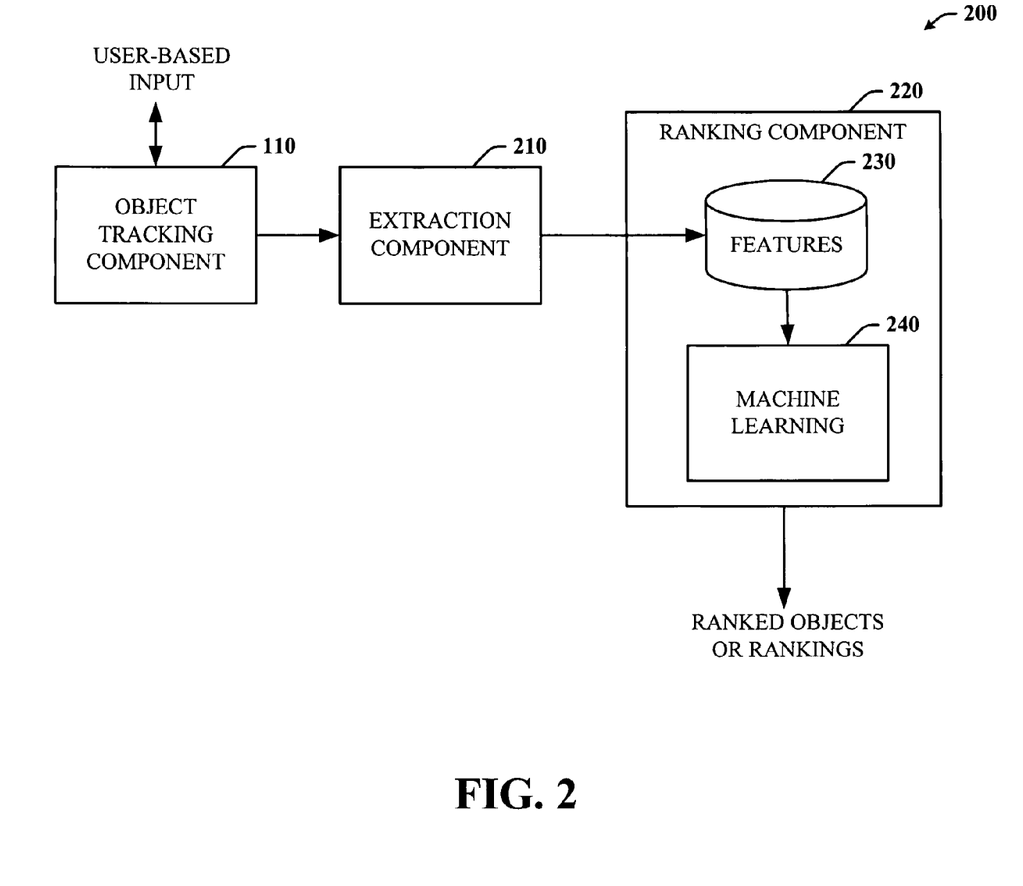
FIG. 2 is a block diagram of a data ranking system that facilitates improving the quality and accuracy of search results in part by collecting information related to objects and using at least a portion of this information as features of a machine learning system to obtain scores, and thus rankings for the objects.

Referring now to FIG. 2, there is a block diagram of a data ranking system 200 that facilitates improving the quality and accuracy of search results in part by collecting information related to objects and using at least a portion of the information as features of a machine learning system to obtain scores for the objects. The system 200 includes an object tracking component 110 as previously described in FIG. 1, supra. The information obtained by the object tracking component 110 can be communicated to an extraction component 210.

The extraction component 210 can extract at least a portion of the information, which can be employed as features 230 in connection with the ranking component 220. The various features 230 can be entered into a machine learning component 240 in order to generate scores for any objects that have been accessed pursuant to a designated ranking model or scheme. That is, objects can be ranked according to one or more preferences such as by time of day, by user interest, by object subject, etc., or any combination thereof.

In practice, for example, imagine that Mona desires to optimize the ranking of documents searchable by her browser based on the time of day (e.g., between 8:00 AM and 12:00 PM). Thus, only documents accessed within this time frame are utilized or considered by the ranking system 200.

Likewise, objects can be ranked according to similar user interests or backgrounds. The object tracking component 110 can track the user's information such as from the user profile. The user's information can also be based on the user's search or browse history or can be derived from the user's profile. By way of example, any object accessed by users with similar interests in sports can be ranked accordingly. Thus, any other objects accessed by users "outside" of this interest group may not be considered by the ranking system 200. In other words, the manner in which objects are ranked can be customized. It should be appreciated that the network operator or browser application operator can also specify the ranking preferences.

Figure 3:
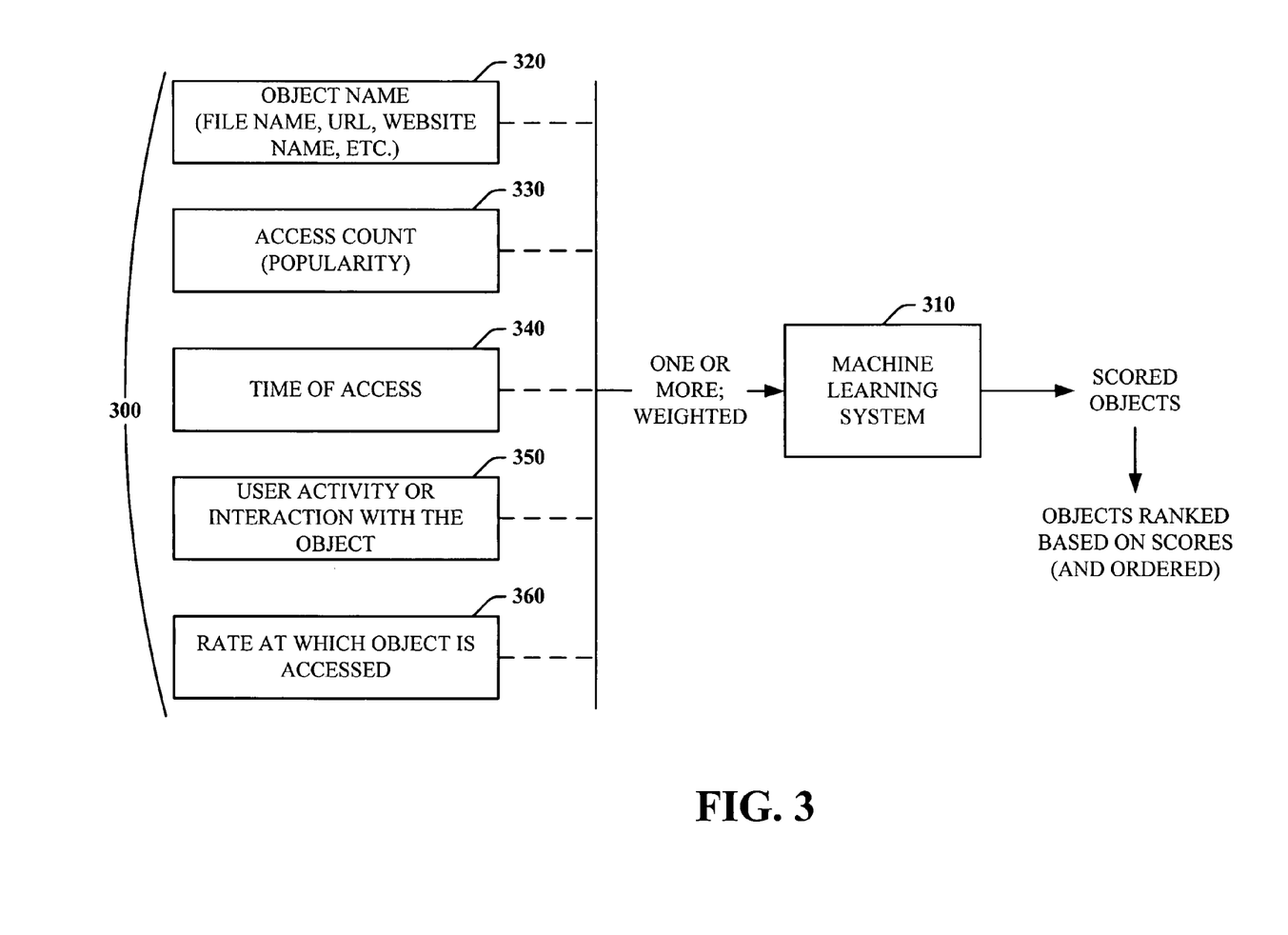
FIG. 3 is a block diagram demonstrating a plurality of features that can be employed by a machine learning system to compute scores for any number of objects that have been accessed, visited, or viewed by users which facilitates determining a ranking of the objects.

Moving on now, the block diagram demonstrated in FIG. 3 further illustrates a plurality of features 300 which can be employed by a machine learning system 310 to facilitate determining popularity based rankings. One or more features 300 can be used as inputs into the machine learning system 310 to compute a score for each object. Exemplary features 300 may include, but are not limited to, the object name 320, the access count 330 (apparent popularity of the object), the time of such access 340, the user's behavior or interaction with the object 350, and/or the rate at which the object is accessed 360 (by the same user or by different users). Other possible features that are not shown can include the ID of the machine accessing the object, user name, duration of time that the object is accessed, and/or the content or subject matter of the object.

Each feature can be assigned a weight according to its desired influence on the score. For instance, suppose that an object named Blue has an access count of 2385 within a 3 hour period—giving it an access rate of 795 hits per hour or 39.75 hits per minute. The features that can be entered into the machine learning system are the object name 320, the access count 330, and the access rate 360. When the computed access rate for an object exceeds a threshold value, the weight assigned to the access count can be lowered in order to mitigate "spammer objects" or the like from obtaining inflated rankings. Therefore, the access rate value can discount the access count, and thus, the object's popularity, by some amount. The amount may be relatively small or substantial depending on the circumstances. The threshold value may be calculated based on the average browsing rate or can be otherwise determined by the ranking system.

If more than one user (or machine) is accessing the object and thus contributing to the high access rate (above normal or above average) and other collected data suggest that the users are almost immediately exiting, leaving, or closing the object, then the object is likely to be fraudulent or misleading in some way. The object can be flagged or marked for further investigation or monitoring; but overall, its ranking will decrease or be lower in order to preserve the integrity of the ranking system.

When it is determined that one user or machine is contributing to the high access rate, then this user or machine can be marked as suspicious. Any subsequent data or feedback received from the user or machine can be down-weighted or thrown out in some cases if it appears the user or machine is more likely to be untrustworthy or fraudulent.

The particular weights assigned to the features can be learned as well through machine learning. For instance, the weight of the access rate can vary based on the rate itself. Slightly above average rates can result in one range of weights whereas extremely high rates can result in a different range of weights.

Based on the features selected for input and their respective weights, the machine learning component 310 can compute popularity based scores for the relevant objects to determine their rankings. Since the features are weighted, the apparent popularity of an object as determined in large part by the access count can be downgraded to account for extenuating factors such as suspicious or fraudulent users.

Figure 4:
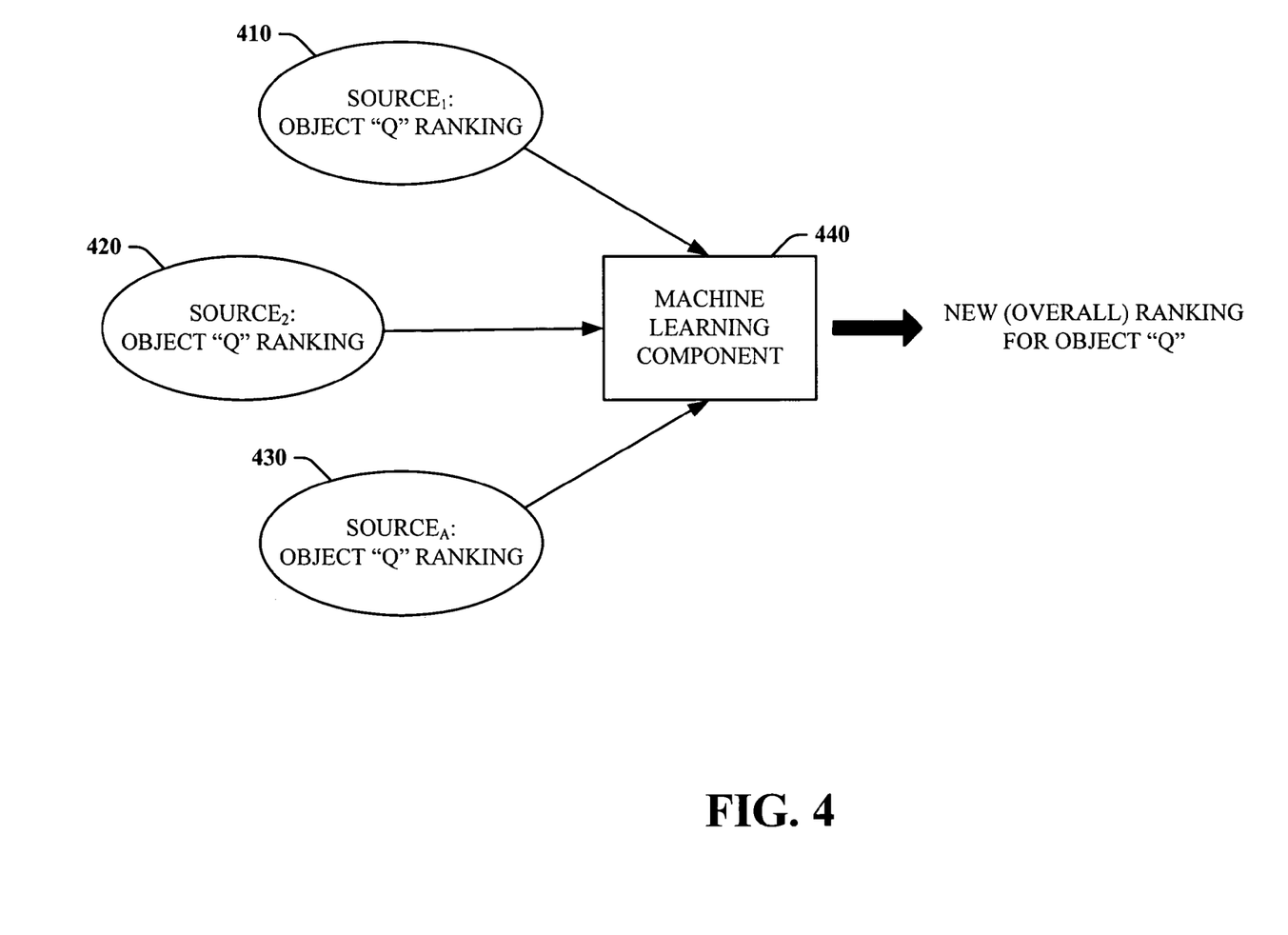
FIG. 4 is a block diagram demonstrating a plurality of rankings from various sources can be involved in determining a ranking of an object.

Turning now to FIG. 4, there is a block diagram demonstrating a plurality of rankings from one or more sources which can be involved in determining a final ranking of an object. In particular, popularity based rankings from multiple sources can be combined in some manner to generate an overall ranking for the object. According to one approach, the data from the multiple sources (e.g., source$_1$ 410, source$_2$ 420, and optionally source$_A$ 430, where A is an integer greater than or equal to 1) can be used as features for a machine learning component 440 to obtain a new ranking for the object.

In the case of web objects, more than one source can be combined for the whole population (e.g., browser plug-in tracking data and data from another general traffic monitoring source such as from a commercial service) or for combining multiple disparate sources, such as the "Company B" popularity ranking (e.g., from the web proxy server at Company B) and the general Internet ranking for a particular page or domain.

Figure 5:
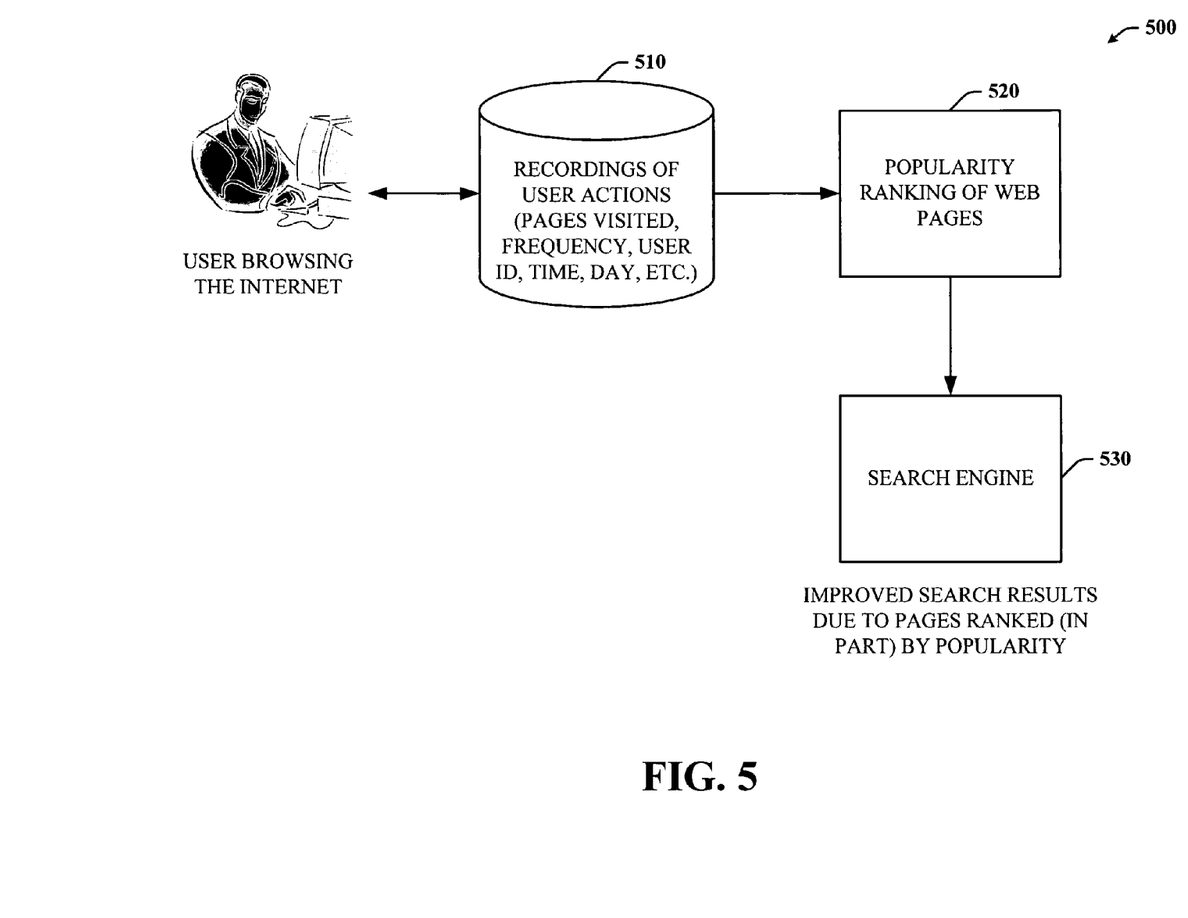
FIG. 5 is a block diagram of a data ranking system that can be employed with respect to web page objects that facilitates obtaining more accurate search results when searching web-based applications.

Referring now to FIG. 5, there is a block diagram of a data ranking system 500 that can be employed with respect to web objects that facilitates obtaining more accurate search results on the Internet. The system 500 includes a data store 510 for maintaining recordings of user actions observed or detected while the user browses the Internet. Popularity based rankings 520 can be computed based in part on the number of times a web page was visited. These rankings 520 can be communicated to and used by a search engine 530 to assist in returning more relevant results to web searchers.

In practice, imagine this scenario: Sam is browsing the web. PQR Browser Plug-in, for those users who have opted in, sends back to QWE Ranking System a list of what URLs the user visited, what time he visited them, etc. This data is stored on QWE servers. QWE can go through that list and count how many times each page has been viewed by a user, how many times a given domain has been viewed by a user, how many times a domain+toplevel (e.g., www.qwerank.com/ie) has been viewed, etc. These statistics can then be used to improve the query-independent ranking of web pages (their static rank). For instance, QWE may take a weighted sum of the logs of these counts, where the weights for each count are learned using machine learning.

The resulting ranking helps the search engine provide more relevant results to the people who are searching the web, since it is more likely to return pages which many people have visited. According to actual experiments performed, the accuracy of search results for a given search query using the popularity based system described hereinabove increased over the conventional rank system. In fact, it was determined that 50% of the performance gain observed by the testers is due to the browser tracking count. Thus, popularity based rankings can and do improve the quality of search results. Such rankings also help the search engine order its index so that it can retrieve good pages more efficiently. Finally, they can help the search engine determine which pages to crawl and/or re-crawl since it is more useful to re-crawl pages that are highly relevant and good rather than re-crawling poor or fraudulent pages.

Although FIG. 5 has been discussed from the perspective of Internet activity and web page objects, it should be appreciated that the discussion can be applied to a variety of search tasks such as those performed on a desktop or on an intranet for example.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with the subject application.

Figure 6:
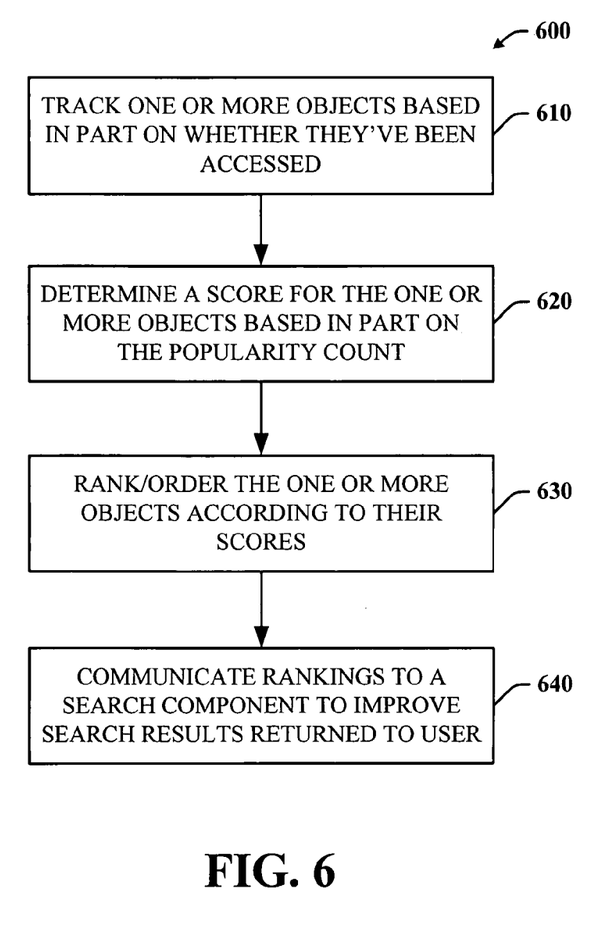
FIG. 6 is a flow chart illustrating an exemplary methodology that facilitates improving the quality and accuracy of search results for searches conducted on the Internet, intranet, desktop, and/or other computing device.

Turning now to FIG. 6, there is a flow diagram illustrating an exemplary method 600 that facilitates improving the quality and accuracy of search results for searches conducted on the Internet, intranet, desktop, and/or any other computing device. The method involves 600 tracking one or more objects based in part on whether the object has been accessed at 610. That is, objects which have or have not been accessed can be tracked and/or recorded. In particular, the number of times an object is accessed can be tracked and recorded (e.g., popularity measure). Similarly, the number of times an object is ignored can be tracked as well. At 620, a score for the one or more objects can be determined based in part on the popularity measure. For instance, the score can be equivalent to the popularity measure or can be a function thereof.

At 630, the objects can be ranked and/or ordered according to their scores. These rankings can be communicated to a search component at 640 to improve the quality of search results and the efficiency at which they are provided to the user.

Figure 7:
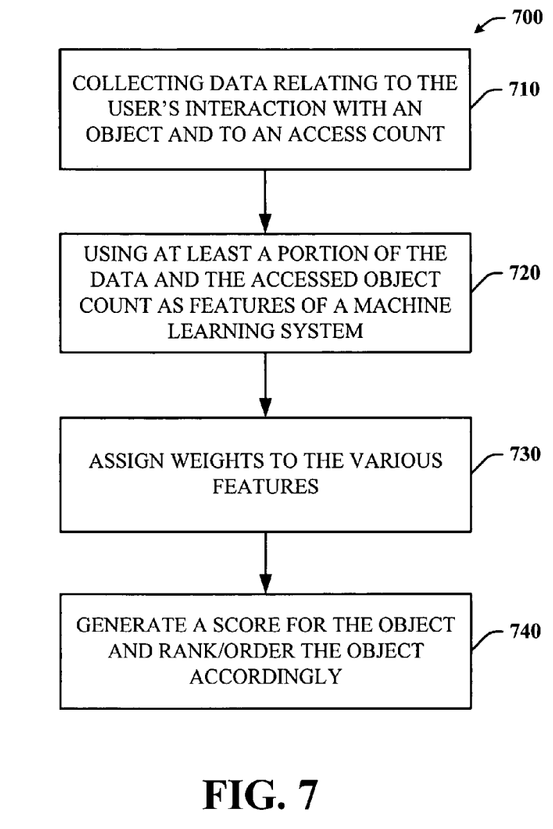
FIG. 7 is a flow chart illustrating an exemplary methodology that facilitates enhancing the quality, accuracy and efficiencies related to returning search results to a user based in part by customizing a manner in which objects are ranked.

In FIG. 7, there is a flow diagram illustrating an exemplary method 700 that facilitates enhancing the quality, accuracy and efficiencies related to returning search results to a user in part by customizing one manner in which objects are ranked. The method 700 involves collecting a plurality of data relating to the user's interaction with an object and to the number of times an object is accessed (access count) at 710. The data can include the time the object is accessed, the user or machine ID that accessed the object, and/or the rate or frequency at which the object is accessed.

At 720, at least a portion of the data as well as the access count can be employed as features of a machine learning system to facilitate customization of the ranking system. In particular, it may be desired to rank objects based on time of day or user interests. For example, when ranking objects during the night time hours (e.g., 5:00 PM-11:59 PM), only objects accessed during this time frame may be ranked. Objects accessed at 4:59 PM or earlier and objects accessed at 12:00 AM or later are excluded from the ranking.

At 730, a weight can be assigned to each of the data employed. For example, the access count can be an indication of the object's popularity. Thus, the weight assigned thereto can reflect this level of importance since an object's popularity value or some function thereof can optimize the return of search results. However, the access count can be considered together with the rate at which the object was accessed, for instance. If the rate exceeds a threshold value, then the access count may be deemed to be inflated due to other circumstances. The threshold value can be determined based on an average browsing rate or the average historical hit rate for the object. Thus, an unusually higher access rate can suggest a combination of negative and positive factors. One way to account for them is to discount the access count by some amount according to the access rate value. Following, a score for the object can be generated at 740. This score can assist in the ranking or ordering of the object.

Figure 8:
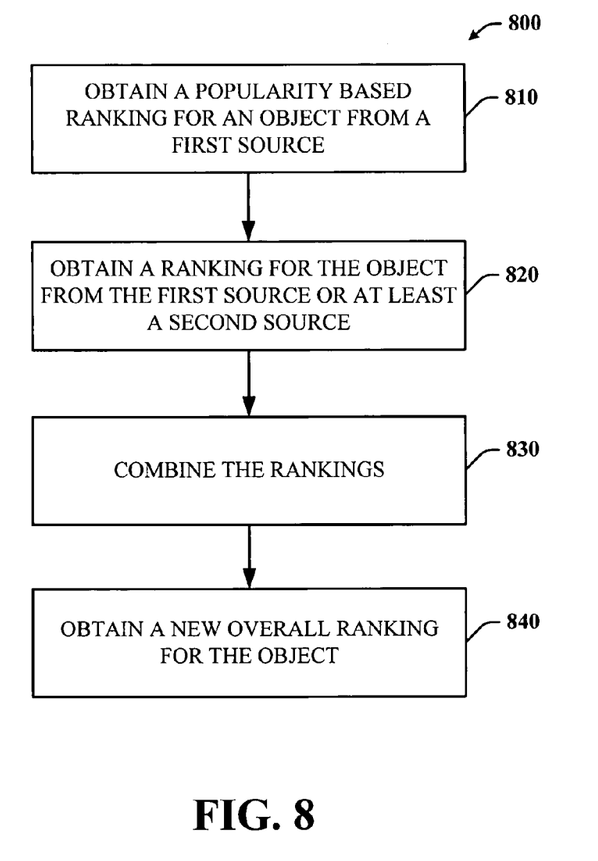
FIG. 8 is a flow chart illustrating an exemplary methodology that facilitates combining multiple rankings from one or more sources for an object in some manner to determine a new overall ranking for the object.

Referring now to FIG. 8, there is a flow diagram illustrating an exemplary method 800 that facilitates combining in some manner multiple rankings from one or more sources for an object to determine a new overall ranking for the object. The method 800 involves obtaining a popularity based ranking for an object from a first source at 810. At 820, another ranking of any type can be obtained from the first source or at least a second source. The multiple rankings can be obtained from a plurality of ranking systems or models and/or a web proxy where appropriate and then combined in some way or according to some function at 830. At 840, a new overall ranking for the object can be produced.

Figure 9:
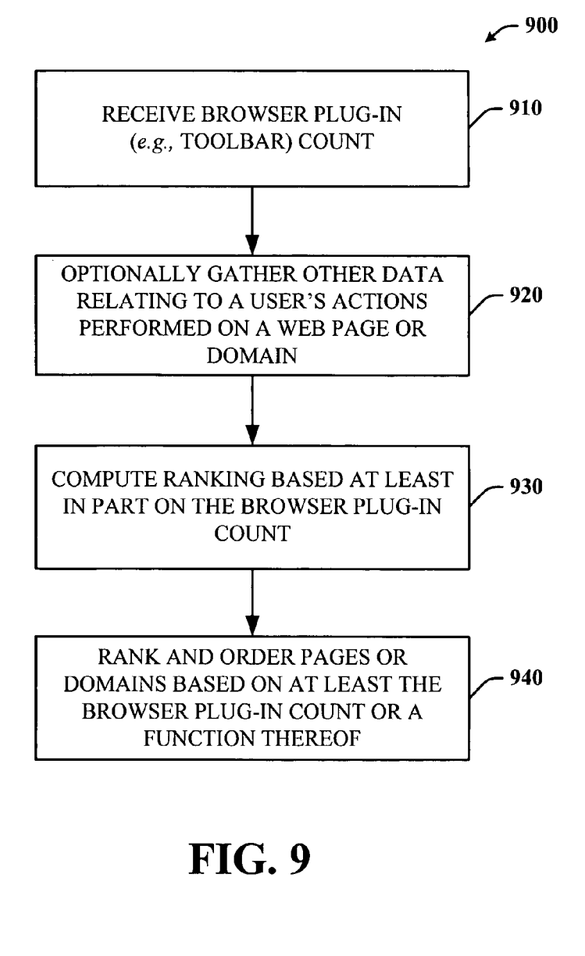
FIG. 9 is a flow chart illustrating an exemplary methodology that facilitates improving search results returned on the Internet.

In FIG. 9, there is another flow diagram which outlines an exemplary method 900 that facilitates improving searching for information on the Internet. Current browser applications are now adopting different functional toolbars, a type of browser plug-in, to further enhance the user's online experience. Many of these toolbars can include a built-in search field, a brief search history, and various control options that can either provide information to the user about the Internet status, connection status, and/or other general information or can collect information directly from the user. In some cases, users are asked to participate in passively providing user feedback to the browser application. For example, by downloading a toolbar, the user may agree to allow some component on the toolbar to passively monitor the user's browsing activity and make a record of URLs, pages, or domains that the user visits (referred to as a toolbar count because a count of each or a total count of all URLs, pages, or domains are maintained).

The method 900 involves receiving a browser plug-in count at 910. At 920, other data relating to the user's actions performed on a web page can be optionally collected at 920. The ranking based at least in part on the browser plug-in count can be computed at 930. At 940, the pages, URLs, or domains can be ranked and ordered based on at least the browser plug-in count or a function thereof.

Figure 10:
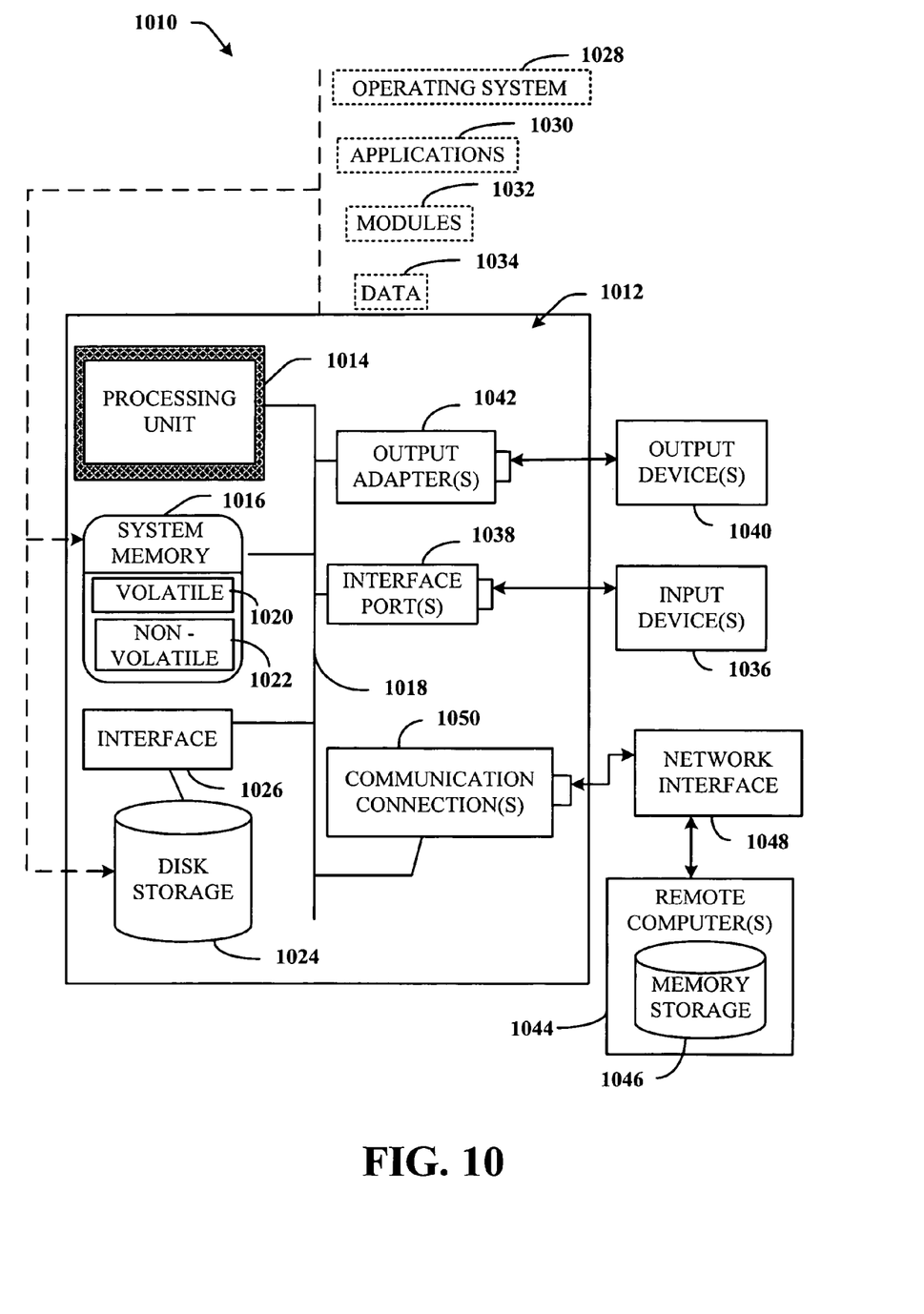
FIG. 10 illustrates an exemplary environment for implementing various aspects of the invention.

In order to provide additional context for various aspects of the subject application, FIG. 10 and the following discussion are intended to provide a brief, general description of a suitable operating environment 1010 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the system and/or method includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject system and/or method can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An object ranking system embodied on a computer readable storage medium that facilitates improving search results and efficiencies comprising:
    an object tracking component that tracks one or more objects and records data in connection with at least one of accessed objects and non-accessed objects to determine a popularity measure for each object, wherein the popularity measure for an object is reduced upon a user selecting the object and navigating away from the object and wherein the popularity measure for an object is signified as being valid upon a user performing at least one of scrolling through the object, book-marking the object, or saving the object;
    a ranking component that determines a score for each of the one or more objects based at least in part on the popularity measure for each object, the ranking component employing the score for each object to generate popularity based rankings for each of the one or more objects;
    an analysis component that counts the number of times objects have been accessed within a period of time and determines the popularity measure based upon at least one of: a count per object, a function of the count per object, and a function of the count per object and the duration of the period of time; and
    a ranking aggregation component that combines object rankings as determined by one or more sources with the popularity based ranking to produce a new popularity based ranking for the one or more objects.

2. The system of claim 1, wherein the popularity measure is a function of one or more of the following: user interaction with the object, length of time the object is accessed, identity of user who accessed the object, or identity of the object accessed.

3. The system of claim 2, wherein the ranking component ranks the one or more objects based in part on one of the following: object access time, object access date, or object access rate.

4. The system of claim 3, wherein the ranking component comprises a machine learning component that facilitates determining the score and is customizable according to user preferences.

5. The system of claim 4, wherein the one or more objects comprise at least one of the following: a web page, a document, an image, a video, a message, or an audio file.

6. The system of claim 5, wherein the object tracking component records at least one of an access count, access rate, access time, access date, or by whom the one or more objects are accessed.

7. The system of claim 6, wherein the ranking component determines the score for the one or more objects using at least one ranking function and the popularity measure wherein such usage by the ranking function depends on at least one of the following: user identity, demographics of the user, user profile data, submission time of query, length of the query, or content of the query.

8. An object ranking method that facilitates improving search engine results and efficiencies comprising employing a processor executing computer executable instructions stored on a computer readable medium to perform the following acts:
    tracking one or more objects, and recording data of a plurality of users in connection with at least one of accessed objects or non-accessed objects to determine a popularity measure for each object with respect to a user, wherein the popularity measure for each object is based upon the recorded data, wherein only the recorded data of users that have one or more similar interests to the user is employed;
    determining a score for each of the one or more objects based at least in part on the popularity measure for each object;
    ranking each of the one or more objects based at least in part on the popularity measure for each object; and
    combining at least one object ranking for one or more objects determined by at least a first source with a popularity based ranking for the same one or more objects to obtain a new popularity based ranking.

9. The method of claim 8, further comprising communicating popularity based rankings to improve search results given in response to search queries.

10. The method of claim 9, further comprising collecting data relating to a user's interaction with the one or more objects.

11. The method of claim 10, further comprising determining the score for the one or more objects based on the popularity measure and at least a portion of data collected relating to the user's interaction with the one or more objects.

12. The method of claim 11, further comprising mitigating the popularity measure based in part on the portion of data collected.

13. The method of claim 12, wherein the data comprises time of access.

14. The method of claim 13, further comprising ranking the one or more objects based on a function of the popularity measure.

15. The method of claim 14, further comprising employing machine learning to determine the scores for the one or more objects.

16. An object ranking system embodied on a computer readable storage medium that facilitates improving search results and efficiencies comprising:
   an object tracking component that tracks one or more objects and records data in connection with at least one of accessed objects and non-accessed objects to determine a popularity measure for each object, wherein the popularity measure for an object is reduced upon a user selecting the object and navigating away from the object and wherein the popularity measure for an object is a function of a user interaction with the object, and is signified as being valid upon a user scrolling through the object or book-marking the object;
   a ranking component comprising a machine learning component, the ranking component being configured to determine a score for each of the one or more objects based at least in part on the popularity measure for each object, the ranking component employing the score for each object to generate popularity based rankings for each of the one or more objects;
   an analysis component that counts the number of times objects have been accessed within a period of time and determines the popularity measure based upon a function of a count per object and a duration of the period of time; and
   a ranking aggregation component that combines object rankings as determined by one or more sources with the popularity based ranking to produce a new popularity based ranking for the one or more objects, wherein
   the machine learning component facilitates determining the score and is customizable according to user preferences, and
   the ranking component ranks the one or more objects based at least partially upon an object access time, and determines the score for the one or more objects using at least one ranking function and the popularity measure, the usage of the at least one ranking function depending upon user profile data and content of a query.

* * * * *